July 20, 1937. E. A. WEISS 2,087,271
MOTOR VEHICLE
Filed Sept. 14, 1934 2 Sheets-Sheet 1
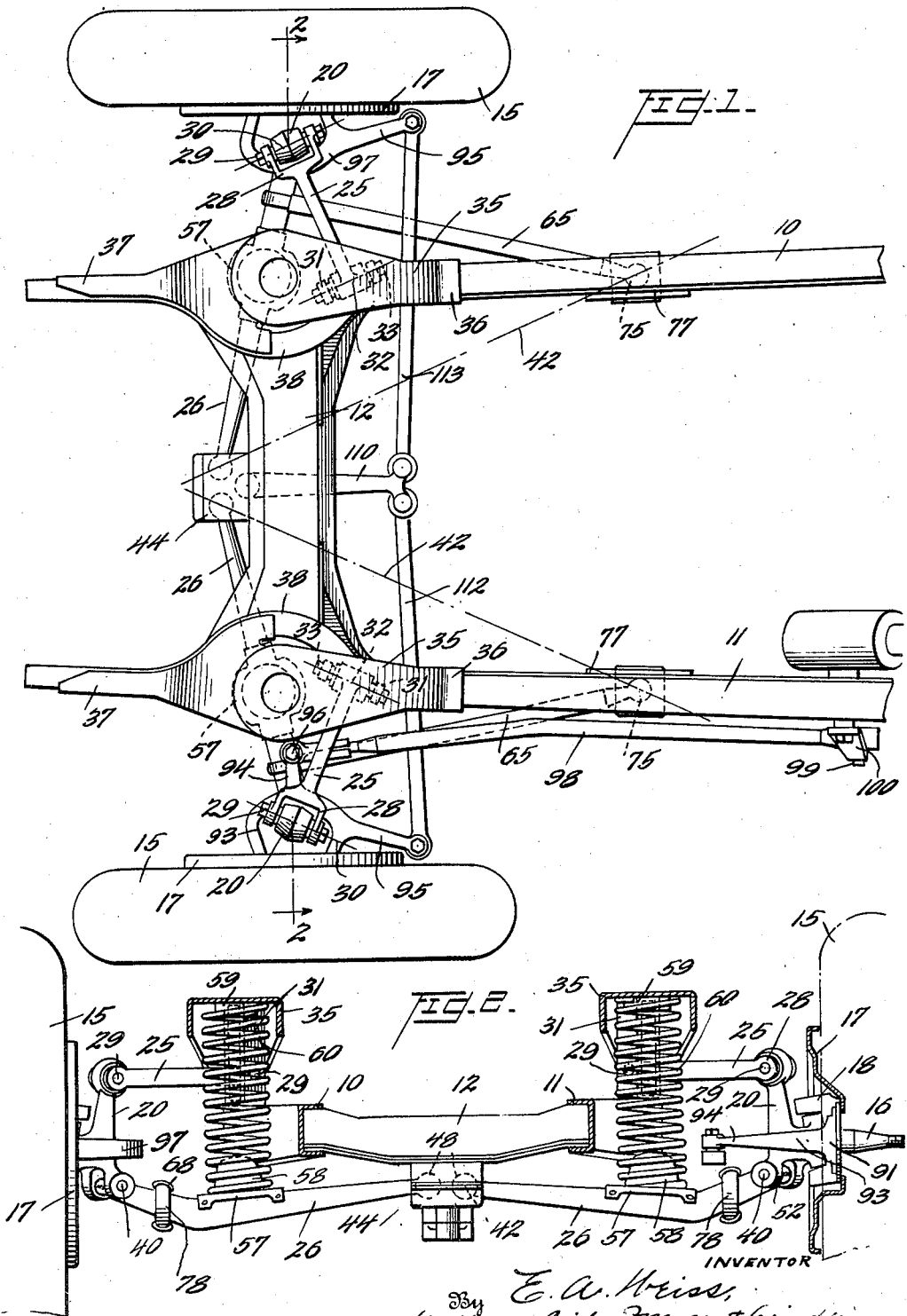
INVENTOR
E. A. Weiss
By Watson, Coit, Morse & Grindle
Attorneys July 20, 1937.  E. A. WEISS  2,087,271
MOTOR VEHICLE
Filed Sept. 14, 1934  2 Sheets-Sheet 2
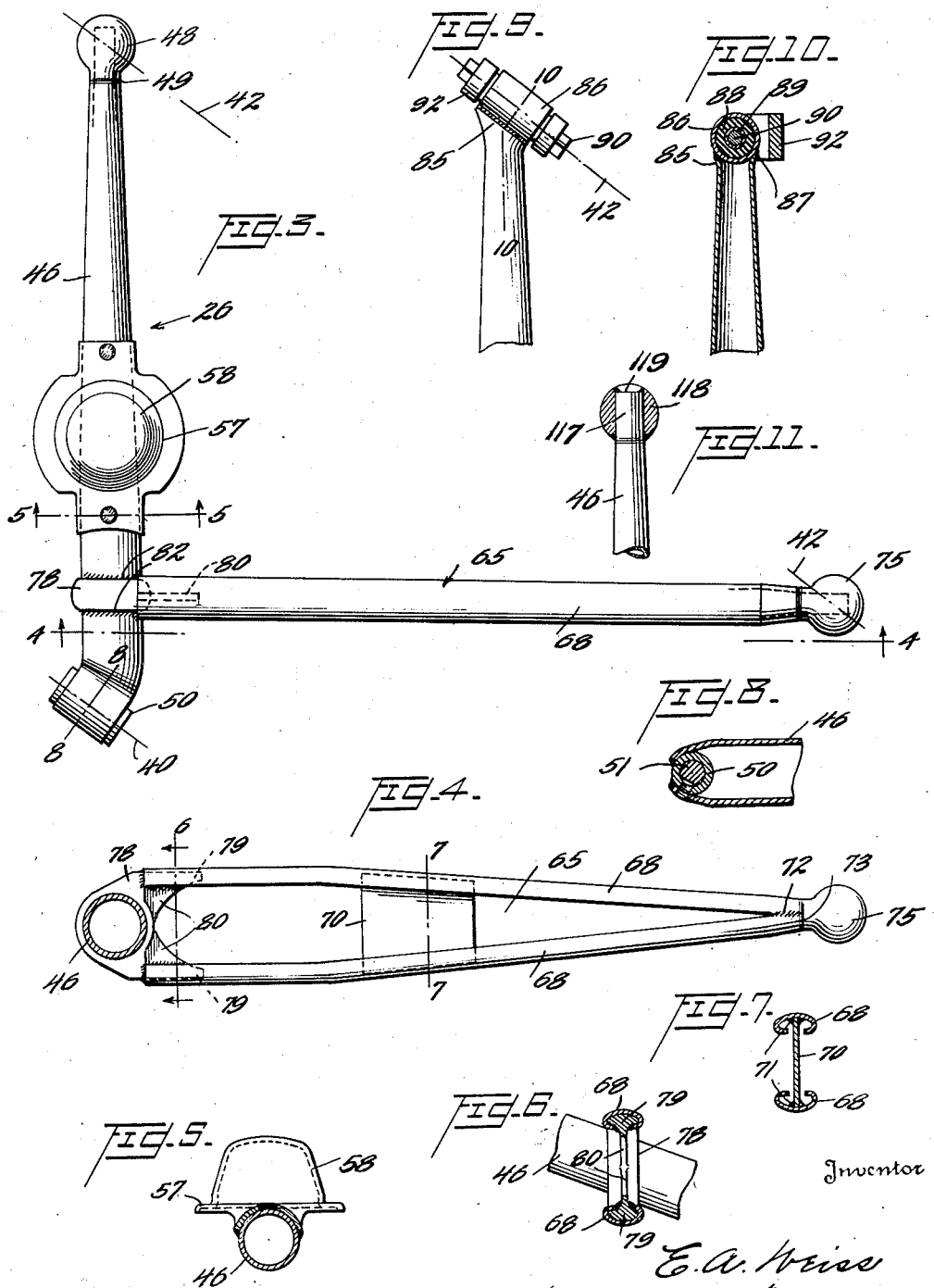

Patented July 20, 1937

2,087,271

UNITED STATES PATENT OFFICE 2,087,271

MOTOR VEHICLE

Erwin A. Weiss, Detroit, Mich., assignor to Packard Motor Car Company, Detroit, Mich., a corporation of Michigan Application September 14, 1934, Serial No. 744,075

13 Claims. (Cl. 267—20)

This invention relates to improvements in motor vehicles and more particularly to vehicles of the type in which the road wheels are independently sprung from the vehicle frame.

It is the principal object of the invention to provide a wheel supporting structure which will materially improve the riding qualities of the vehicle and the ease with which steering may be effected and which will afford the strength necessary to withstand hard usage.

It is a feature of the invention that the weight of the vehicle suspension, and particularly the unsprung weight, is reduced to a minimum, the structure being nevertheless sufficiently sturdy for operation under the most severe conditions and when employed in heavy vehicles.

A more specific object of the invention is the provision in an independent wheel suspension employing parallel links or the like, of at least one link formed of relatively thin flat metal stock, deformed to generally curved cross-sectional configuration, this type of construction being preferably employed in that link which sustains the major portion of the load. In the preferred form of the invention, two links of different lengths are provided, the longer of these links being generally tubular and so formed as to reduce to a minimum the cost of manufacture and the weight of the link without sacrifice of strength.

A further object of the invention is the provision in an independent wheel suspension of the parallel link type, of a torque arm extending generally longitudinally of the vehicle frame, this torque arm being secured to and preferably formed integrally with that link which carries the greater load, the link and torque arm being of generally tubular construction or otherwise formed principally of thin flat metal stock shaped and suitably reinforced so as to afford maximum strength.

Further objects and features of the invention will be apparent from the following description, taken in connection with the accompanying drawings, in which Figure 1 is a plan view of a portion of a motor vehicle frame illustrating the application thereto of one form of the present invention;

Figure 2 is a transverse sectional view taken substantially on the line 2—2 of Figure 1;

Figure 3 is a plan view of a combined wheel supporting link and torque arm suitable for use in the wheel suspension illustrated in Figures 1 and 2;

Figure 4 is a side elevation of the torque arm shown in Figure 3;

Figure 5 is a sectional view taken substantially on the line 5—5 of Figure 3;

Figure 6 is a sectional view taken substantially on the line 6—6 of Figure 4;

Figure 7 is a sectional view taken substantially on the line 7—7 of Figure 4;

Figure 8 is a sectional view taken substantially on the line 8—8 of Figure 3;

Figure 9 is a fragmentary plan view of one end of a wheel supporting link such as shown in Figure 3, illustrating a modified form of the link;

Figure 10 is a sectional view taken substantially on the line 10—10 of Figure 9; and Figure 11 is a view partly in section of a portion of the structure shown in Figure 3 illustrating a slight modification.

In describing the invention, reference will be made to the drawings illustrating one form of the invention only in the application thereof to the front steerable road wheels of a vehicle. It will nevertheless be understood that certain features of the wheel suspension shown herein are equally as applicable to the rear road wheels and to road wheels which are not steerable. It will furthermore be appreciated that while the various elements disclosed in the drawings are described hereinafter by specific language in order to facilitate an understanding of the principles of the invention and to simplify this descriptive matter, no limitation of the invention is thereby intended, various alterations of the structural details such as fall within the scope of the invention as defined within the appended claims being contemplated.

Referring first to Figures 1 and 2 of the drawings, it will be observed that the vehicle frame is illustrated as including side frame members 10 and 11, which may be of the usual channel or box type, and a cross frame member 12 extending between and rigidly secured to the two side frame members 10 and 11 adjacent the forward end of the latter. So far as the wheel suspension is concerned, the construction is preferably identical at the two sides of the vehicle, and it will therefore suffice in the following description to refer to those elements of the suspension disposed at one side only of the central longitudinal plane of the vehicle, the same reference characters being used in connection with corresponding elements associated with the two road wheels.

Thus each road wheel 15 is rotatably mounted in the conventional manner on a wheel spindle 16, the latter being provided with the usual brake backing plate 17. The wheel spindle 16 is preferably formed integrally with a steering knuckle 18, the latter being supported for swinging steering movement on a knuckle carrying member 20, for instance, by means of the usual king pin which may extend through the knuckle and its supporting member.

The knuckle carrying member 20 is formed to provide upstanding and downwardly directed arms which constitute with the member 20 an integral unit. Since the precise shape of this member is not material, these integrally formed arms need not be separately designated, but in the form of the invention shown in the drawings they are pivotally connected respectively to upper and lower wheel supporting links 25 and 26 which are in turn pivotally connected at their inner ends to the vehicle frame. Thus the outer end of the wheel supporting link 25 may be formed to provide a yoke-shaped portion 28 embracing the upper end of the knuckle carrying member 20, the bolt 29 passing through the link 25 and the member 20 to connect the link and the member for relative movement about a pivotal axis 30. The inner end of the link 25 is similarly supported within a yoke-shaped member 31 for pivotal movement with respect thereto about an axis 32, a bolt 33 passing through the member 31 and the link 25, the axes 30 and 32 being parallel.

The yoke-shaped member 31 is supported between the side frame member 10 or 11 and the frame bracket 35 and is rigidly secured to both, the bracket 35 being preferably shaped as shown in Figures 1 and 2 of the drawings and being secured to the side frame member as at 36 and 37, thus forming in effect a continuation of the side frame member, the latter being deflected or curved inwardly as at 38 adjacent the road wheel.

The lower wheel supporting link 26 is similarly pivotally connected to the knuckle carrying member 20 and to the vehicle frame for swinging movement with respect to both about axes indicated at 40 and 42 respectively, the pivotal connection at the inner end of the wheel supporting link 26 to the frame including a bracket 44 which is secured to and dependent from the cross frame member 12.

It will be observed that the lower wheel supporting link 26 is of greater length than the upper wheel supporting link 25. By reason of this difference in the length of the links, the plane of the road wheel is altered as the wheel rises, the upper portion of the wheel moving inwardly to a greater extent than the lower portion thereof. This inclination of the plane of the wheel as it rises is utilized to compensate for the inward shifting of the tread portion which ordinarily occurs when parallel links of the same length are employed, and the point of contact of the tread with the ground is caused to rise substantially vertically with the result that scuffing of the tires is avoided.

Since in the preferred form of the present invention the lower link is considerably longer than the upper link, and is further directly associated with the vehicle springs so as to sustain the major portion of the vehicle load, it is important that the construction of the link be such as to afford the maximum strength without unnecessary increase in weight, it being appreciated that this link constitutes one of the largest single items of the total unsprung weight in the wheel suspension. One form of link satisfactory for the purpose is shown in Figure 3 of the drawings, the entire portion of this link, with the exception of the bearings at the ends of the same, being of generally tubular construction. Thus the body or major portion of this link, indicated at 46, is of rounded contour, preferably circular as shown in Figure 5, and may generally increase in diameter from the inner to the outer end thereof. While integral tubular stock is preferably employed, semi-circular sections can be welded together or the link may be otherwise formed from flat metal stock by bending the latter to such cross-sectional configuration as to afford the greatest strength.

At its inner end a bearing 48 is provided whereby the link may be pivotally connected to the vehicle frame on the axis 42. This bearing may assume the form of a substantially spherical head, preferably hollow, and butt welded as indicated at 49 to the inner end of the link 46. The bearings 48 at the inner ends of each of the oppositely directed lower wheel supporting links may be received by the complementary portions of the bracket 44 secured to the cross frame member 12. This bracket may be constructed in the usual manner to provide a body portion and a cap portion bolted thereto, each portion having semi-spherical recesses therein in which the bearings 48 are confined.

At its outer end the tubular stock which forms the body of the link is shaped as shown more particularly in Figure 8 to provide a reduced portion which is split and curved about and welded to a transversely extending tubular member 50, the latter being adapted to receive therein a bearing pin 51 which extends laterally on either side of the link for the purpose of engaging the forked portion 52 of the wheel carrying member 20, this arrangement constituting the pivotal connection on the axis 40 between the lower link 26 and the road wheel assembly.

Intermediate the ends thereof the link 26 may be provided with a spring seat 57 having an upstanding boss 58 on the upper face thereof, the latter forming a guide for a coil spring 60 which is interposed under compression between the link 26 and the bracket 35, the bracket 35 being provided with a downwardly directed annular flange 59 forming a guide to receive the upper end of the spring 60. Spring seat 57 may be formed of flat metal stock and may be secured to the link in any convenient manner, for instance by welding as at 61, the laterally directed portions of the seat being formed to fit about the upper surface of the link.

In order to adequately resist braking torque and other stresses in the wheel suspension, a torque arm 65 is provided, this torque arm extending generally longitudinally of the vehicle frame and having an articulated connection at the rear end thereof with the vehicle frame, and being connected, preferably rigidly, at its forward end with the lower wheel supporting link 26. In the preferred form of the invention the lower wheel supporting link and torque arm are both formed principally of flat metal stock and are constructed to provide a unitary member of which both component parts exhibit the maximum strength with the minimum weight permissible. Thus the torque arm which is illustrated more particularly in Figures 3 and 4 of the drawings may be formed principally of two vertically spaced, generally semi-tubular sections 68, the preferred contour in cross-section of these sections being indicated more particularly in Figure 7. A strengthening web 70 of substantially flat sheet material preferably extends between the sections 68 and is welded thereto as indicated at 71. In Figure 4 the web 70 is shown as directly reinforcing only the central portion of the torque arm intermediate the ends thereof, but it will be appreciated that the length of this web may be increased, if desired, to extend along the entire length of the torque arm. Adjacent the rearward end of the torque arm the sections 68 thereof converge and are welded together as indicated at 72 to form a generally circular portion to which is butt welded as at 73 a substantially spherical head 75, the latter being received in a complementary spherical seat in a supporting bracket 77, secured to the adjacent side frame member. At its forward end the torque arm 65 receives a member 78 which is provided with rearwardly directed forks 79 arranged to fit snugly within and welded to each of the sections 68 of the torque arm as shown more particularly in Figure 6. An integral reinforcing web 80 extends between the forks 79, and the body of the member 78 is of generally annular shape, embracing the lower wheel supporting link 26 and preferably welded thereto as indicated at 82.

In the modified form of the invention shown in Figures 9 and 10 of the drawings, the inner end of the lower wheel supporting link is split and curved as indicated at 85. A sleeve 86 is welded thereto as at 87, this sleeve preferably forming part of a well-known commercial type of bearing employing rubber, the construction being such that the rubber is stressed as the parts partake of relative pivotal movement, static friction being thereby eliminated. Thus a rubber sleeve 88 may be interposed between an inner sleeve 89 and the outer sleeve 86, the rubber being forced between these sleeves under pressure so that no rubbing occurs as one sleeve is rotated with respect to the other. The inner sleeve 89 is secured against rotation on a stud 90 passing therethrough, the latter being in turn secured rigidly to a bracket 92 carried by the cross frame member 12.

The axis 42 of the bearing just described is parallel to the axis 40 at the outer end of the link, the outer bearing being preferably constructed as indicated in Figure 3 of the drawings. It will also be appreciated that the axis 42 of the bearing shown in Figure 9 must intersect the spherical head 75 at the rearward end of the torque arm, the unitary structure constituted by the lower supporting link 26 and the torque arm 65 swinging upwardly about this axis as the wheel rises and falls, the rising movement being resisted by the coil spring 60.

The axes 30 and 32 on which the upper link is pivoted to the wheel assembly and the vehicle frame respectively, are parallel to the axes 40 and 42, and it will be observed that these axes are inclined at an acute angle to the longitudinal vertical plane of the vehicle frame. These axes may also be inclined at a lesser angle with respect to a horizontal plane, but are shown herein as extending generally horizontally to facilitate the illustration of the invention.

In Figure 11 is illustrated a modified construction applicable to the arrangement shown in Figure 3 and involving a slightly different method of securing either or both the spherical bearings 48 and 75 to the members 46 and 68 respectively. Thus the spherical head 118 may be provided with a generally cylindrical aperture 119 within which the end portion 117 of the member 46 fits snugly, the parts being welded together as indicated.

It is an important feature of this construction that practically the entire stress which is applied to the wheel suspension by the vehicle load and on braking of the vehicle is carried through the lower link 26 and the torque arm 65 to the frame, with the result that the strain on the bearings normally resulting from application of the brakes is greatly reduced. By reason of the special construction of this unitary structure the weight of the major portion of the wheel suspension system is relatively small and yet the necessary strength is secured. While the invention contemplates the application of the same principles of construction to the upper links as well as the lower links, this not so essential since the upper links function primarily to guide the road wheels in their rising and falling movements and are not subjected to severe stresses. Consequently conventional construction may be employed in the upper links without introduction of excessive weight.

Referring now to the steering mechanism, it will be observed that the steering knuckle 18 at the left-hand side of the vehicle carries the steering lever 93 which is preferably secured to the knuckle as at 91, this lever having an inwardly directed arm 94 and a rearwardly directed arm 95. The arm 94 is pivotally connected as at 96 to a rod 98 serving as a steering drag link, the latter having a pivotal connection as at 99 to the usual steering drop arm 100.

The road wheels at opposite sides of the vehicle are further connected for conjoint steering movement so as to ensure perfect steering under all conditions of operation. Thus the rearwardly directed arm 95 of the steering lever 93 at the left-hand side of the vehicle is connected to a lever 110 by means of a tie rod 112 having articulated connection with the arm 95 and with the lever. At the right-hand side of the vehicle a similar arm 95 is formed on a steering lever 97 rigidly secured to the adjacent steering knuckle 18, and the arm 95 is likewise connected with the lever 110 by means of a tie rod 113. The lever 110 is preferably supported for pivotal movement about a substantially vertical axis on the bracket 44 hereinbefore referred to. By means of this construction the two road wheels are caused to execute similar steering movement in response to displacement of the steering drag link 98 longitudinally of the vehicle.

The present invention is an improvement on the invention disclosed in the prior application of Clyde R. Paton, Serial No. 702,615, filed December 15, 1933. It is contemplated that the improvements set forth herein and relating more particularly to the wheel supporting link and torque arm structure may be employed for the purposes and with the advantages set forth in the prior application referred to. It is nevertheless apparent that the link and torque arm structure described herein may be used in other types of independent wheel suspension.

Having thus described the invention, what is claimed as new and desired to be secured by Letters Patent is:

1. A wheel supporting link for vehicle suspensions of the independent type comprising an elongated body formed of thin flat metal stock shaped to a generally curved contour in cross-section and having pivot bearing engaging means at the opposite ends thereof, said pivot bearing engaging means being welded to the body of said link to form therewith an integral structure.

2. A wheel supporting link for vehicle suspensions of the independent type comprising an elongated body formed of thin flat metal stock shaped to a generally curved contour in cross-section and having pivot bearing engaging means at the opposite ends thereof, and a seat adapted to receive a coil spring, said seat being formed of thin flat metal stock welded to the body of said link.

3. A unitary wheel supporting link and torque arm structure for vehicle suspensions of the independent type formed principally of thin flat metal stock deformed to afford generally curved contours in cross-section.

4. A torque arm for vehicle suspensions of the independent type formed principally of flat metal stock deformed to provide spaced sections, each of transversely curved contour, said sections being connected adjacent each end of the arm.

5. A torque arm for vehicle suspensions of the independent type formed principally of flat metal stock deformed to provide spaced sections, each of transversely curved contour, said sections being connected adjacent each end of the arm, and a reinforcing member of flat metal stock extending between and welded to said sections intermediate the ends of the arm.

6. A torque arm for vehicle suspensions of the independent type formed principally of flat metal stock deformed to provide spaced sections, each of transversely curved contour, said sections being connected adjacent each end of the arm and converging toward and being welded together adjacent one end of the arm.

7. A torque arm for vehicle suspensions of the independent type formed principally of flat metal stock deformed to provide spaced sections, each of transversely curved contour, said sections being connected adjacent each end of the arm, the connection at one end of the arm comprising a member welded to each section and shaped to receive and embrace a transversely extending wheel supporting link.

8. A wheel supporting link for vehicle suspensions of the independent type comprising an elongated body formed of thin flat metal stock shaped to provide a generally tubular structure and having pivot bearing engaging means at the opposite ends thereof, said pivot bearing engaging means being welded to the body of said link to form therewith an integral structure.

9. A wheel supporting link for vehicle suspensions of the independent type comprising an elongated body formed of thin flat metal stock shaped to provide a generally tubular structure and having pivot bearing engaging means at the opposite ends thereof, and a seat adapted to receive a coil spring, said seat being formed of thin flat metal stock welded to the body of said link.

10. A torque arm for vehicle suspensions of the independent type formed principally of flat metal stock deformed to provide spaced generally tubular sections, said sections being connected adjacent each end of the arm.

11. A torque arm for vehicle suspensions of the independent type formed principally of flat metal stock deformed to provide spaced sections, said sections being connected adjacent each end of the arm, and a reinforcing member of flat metal stock extending between and welded to said sections intermediate the ends of the arm.

12. A torque arm for vehicle suspensions of the independent type formed principally of flat metal stock deformed to provide spaced sections, said sections being connected adjacent each end of the arm and converging toward and being welded together adjacent one end of the arm.

13. A torque arm for vehicle suspensions of the independent type formed principally of flat metal stock deformed to provide spaced sections, said sections being connected adjacent each end of the arm, the connection at one end of the arm comprising a member welded to each section and shaped to receive and embrace a transversely extending wheel supporting link.

ERWIN A. WEISS.